United States Patent
Arora et al.

(10) Patent No.: US 11,797,995 B2
(45) Date of Patent: Oct. 24, 2023

(54) METHOD AND SYSTEM FOR RISK SCORING ANONYMIZED TRANSACTIONS

(71) Applicant: Mastercard International Incorporated, Purchase, NY (US)

(72) Inventors: Ankur Arora, New Delhi (IN); Shashank Kumar Trivedi, New Delhi (IN); Amit Gupta, New Delhi (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 227 days.

(21) Appl. No.: 15/830,128

(22) Filed: Dec. 4, 2017

(65) Prior Publication Data

US 2019/0172067 A1 Jun. 6, 2019

(51) Int. Cl.
*G06Q 20/40* (2012.01)
*G06Q 20/38* (2012.01)
*G06Q 20/22* (2012.01)

(52) U.S. Cl.
CPC ....... *G06Q 20/4016* (2013.01); *G06Q 20/223* (2013.01); *G06Q 20/383* (2013.01);
(Continued)

(58) Field of Classification Search
None
See application file for complete search history.

(56) References Cited

U.S. PATENT DOCUMENTS

2015/0363770 A1 12/2015 Ronca et al.
2015/0363783 A1* 12/2015 Ronca .................. G06Q 20/382
705/71

(Continued)

FOREIGN PATENT DOCUMENTS

CN 106157142 A 11/2016
CN 107085812 A 8/2017
WO WO-2018085558 A2 * 5/2018 ......... G06F 16/2228

OTHER PUBLICATIONS

Seth "Public, Private, Permissioned Blockchains Compared", https://www.investopedia.com. (Year: 2022).*

(Continued)

*Primary Examiner* — Neha Patel
*Assistant Examiner* — Clay C Lee
(74) *Attorney, Agent, or Firm* — Panitch Schwarze Belisario & Nadel LLP

(57) ABSTRACT

A method for risk scoring a blockchain transaction includes: storing blockchain data associated with a blockchain, the data including a plurality of blocks, each block including a block header and transaction values, each transaction value including a sending address, recipient address, and transaction amount; receiving a new transaction value related to a proposed blockchain transaction and a node identifier associated with a node included in a blockchain network associated with the blockchain, the new transaction value including a user address, transacting address, and blockchain amount; identifying transaction values in the blockchain where the sending address or recipient address is associated with a transacting cryptographic key pair also associated with the transacting address; determining a risk score for the proposed blockchain transaction based on at least the data included in each of the identified transaction values and the new transaction value; and transmitting the determined risk score.

16 Claims, 5 Drawing Sheets

(52) U.S. Cl.
CPC ....... *G06Q 20/389* (2013.01); *G06Q 20/3829* (2013.01); *G06Q 20/4015* (2020.05); *G06Q 2220/00* (2013.01)

(56) References Cited

U.S. PATENT DOCUMENTS

| | | | | |
|---|---|---|---|---|
| 2016/0342978 | A1* | 11/2016 | Davis | G06Q 20/0655 |
| 2017/0076306 | A1* | 3/2017 | Snider | H04W 4/029 |
| 2017/0329922 | A1* | 11/2017 | Eberting | G06Q 20/40 |
| 2018/0165588 | A1* | 6/2018 | Saxena | G06Q 20/02 |
| 2018/0198876 | A1* | 7/2018 | Ma | G06Q 30/02 |
| 2019/0017982 | A1* | 1/2019 | Lamberti | G01N 21/359 |
| 2019/0253258 | A1* | 8/2019 | Thekadath | H04L 9/3239 |
| 2020/0311790 | A1* | 10/2020 | Keren | G06Q 20/4016 |

OTHER PUBLICATIONS

Dennis, R. et al "Rep on the block: A next generation reputation system based on the blockchain", IEEE, International Conference for Internet Technology and Secured Transactions (ICITST), 2015. (Year: 2015).*

Pedro, "Understanding Bitcoin: Cryptography, Engineering, and Economics", Wiley Finance Series, Jan. 1, 2015, pp. 1-290, John Wiley & Sons Ltd, The Atrium, Southern Gate, Chichester, West Sussex, United Kingdom.

Notification of Transmittal of the International Search Report and the Written Opinion of the International Searching Authority (Forms PCT/ISA/220, PCT/ISA/210 and PCT/ISA/237) dated Feb. 28, 2019, by the European Patent Office in corresponding International Application No. PCT/US2018/058648. (11 pages).

Office Action (Notification of Second Office Action) dated Apr. 21, 2023, by the China National Intellectual Property Administration in corresponding Chinese Patent Application No. 201811468865.5 and an English Translation of the Office Action. (14 pages).

Office Action (First Office Action) dated Sep. 14, 2022, by the China National Intellectual Property Administration in corresponding Chinese Patent Application No. 201811468865.5 and an English Translation of the Office Action. (25 pages).

Dong, Li, et al., "Theory, Application Fields and Challenge of the Blockchain Technology", Telecommunications Science, No. 12 20161231, Section 2, pp. 1-16.

Rejection Decision, dated Jul. 29, 2023, issued in corresponding Chinese Patent Application No. 201811468865.5 with English language translation, 12 pgs.

* cited by examiner

METHOD AND SYSTEM FOR RISK SCORING ANONYMIZED TRANSACTIONS

FIELD

The present disclosure relates to the risk scoring of anonymized transactions, such as blockchain transactions, and more specifically to the use of transactional history of blockchain wallets and the nodes used in a blockchain transaction to estimate the risk of a transaction where the real identity of a transacting party is unknown.

BACKGROUND

There are a variety of reasons that have led to blockchains seeing increased usage as a platform for electronic commerce. One notable reason that has led many to blockchains is anonymization: the identity of the user behind a blockchain wallet is kept anonymous. There are many cases where an individual or other entity may wish to keep themselves anonymous when making a transaction, such as when purchasing gifts, buying potentially embarrassing products, avoid being profiled for advertising and the like, or merely a desire to keep their purchasing habits private. This has led to a number of individuals utilizing blockchain for e-commerce transactions where both parties are anonymous. In these cases, when a merchant or individual is transacting with another, the only knowledge they may have of the other party to the transaction is an address of their electronic wallet.

While the anonymization may be beneficial for protecting a consumer's identity, it may also be detrimental for the same reason. The anonymous nature of traditional blockchain transactions is such that a consumer does not know who they are transacting with, and thus may be transacting with an individual or entity that is less than trustworthy or that may be attempting to take advantage of the consumer. In traditional e-commerce transactions, a payment network and issuing institution often works on behalf of the consumer to protect the consumer against fraud, by verifying identities and by also providing several types of recourse to a consumer if fraud is perpetuated. For blockchain transactions, there is often no recourse available at all; once the transaction has been processed it is impossible to be reversed and there is no regulatory body that can enforce a payee to pay back the payor.

Thus, there is a need for a technological solution to provide for a manner of identifying the probability of fraud in blockchain transactions where a party is anonymous, particularly in instances where one party to the transaction may be unable to identify or analyze any available transactional data of the other party to the transaction.

SUMMARY

The present disclosure provides a description of systems and methods for the risk scoring of blockchain transactions. When a blockchain transaction is proposed, the blockchain is analyzed to identify historical data for the opposing entity in the transaction. The system analyzes all of the transactions that entity has conducted to identify instances of fraud, attempted fraud, likely fraud, and other indicators that may affect the trustworthiness of the entity and/or proposed transaction. In addition, the system can analyze the transactional frequency and history of fraud of the node being used to submit the transaction to the blockchain to identify trustworthiness of the node, such as to detect if the node is compromised, to provide for strong risk scoring. The risk score can be provided to the entity that submitted the proposed transaction, which may provide them with sufficient knowledge to decide to move forward or withhold the transaction, while still maintaining the anonymity of the parties to the transaction.

A method for risk scoring a blockchain transaction includes: storing, in a memory of a processing server, blockchain data associated with a blockchain, wherein the blockchain data includes at least a plurality of blocks, each block including at least a block header and one or more transaction values, where each block header includes at least a timestamp, a block reference, and a transaction reference and each transaction value includes data related to a blockchain transaction including at least a sending address, a recipient address, and a transaction amount; receiving, by a receiving device of the processing server, a new transaction value related to a proposed blockchain transaction and a node identifier associated with a node included in a blockchain network associated with the blockchain, wherein the new transaction value includes at least a user address, a transacting address, and a blockchain amount; executing, by a querying module of the processing server, a first query on the memory to identify a first plurality of transaction values included in the plurality of blocks in the blockchain where the sending address or recipient address is associated with a transacting cryptographic key pair, wherein the transacting address is associated with the transacting cryptographic key pair; determining, by a determination module of the processing server, a risk score for the proposed blockchain transaction based on at least the data included in each of the first plurality of transaction values and the new transaction value; and electronically transmitting, by a transmitting device of the processing server, the determined risk score in response to the received new transaction value.

A system for risk scoring a blockchain transaction includes: a memory of a processing server configured to store blockchain data associated with a blockchain, wherein the blockchain data includes at least a plurality of blocks, each block including at least a block header and one or more transaction values, where each block header includes at least a timestamp, a block reference, and a transaction reference and each transaction value includes data related to a blockchain transaction including at least a sending address, a recipient address, and a transaction amount; a receiving device of the processing server configured to receive a new transaction value related to a proposed blockchain transaction and a node identifier associated with a node included in a blockchain network associated with the blockchain, wherein the new transaction value includes at least a user address, a transacting address, and a blockchain amount; a querying module of the processing server configured to execute a first query on the memory to identify a first plurality of transaction values included in the plurality of blocks in the blockchain where the sending address or recipient address is associated with a transacting cryptographic key pair, wherein the transacting address is associated with the transacting cryptographic key pair; a determination module of the processing server configured to determine a risk score for the proposed blockchain transaction based on at least the data included in each of the first plurality of transaction values and the new transaction value; and a transmitting device of the processing server configured to electronically transmit the determined risk score in response to the received new transaction value.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments is intended for illustration purposes only and is, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for the Risk Scoring Blockchain Transactions

Figure 1:
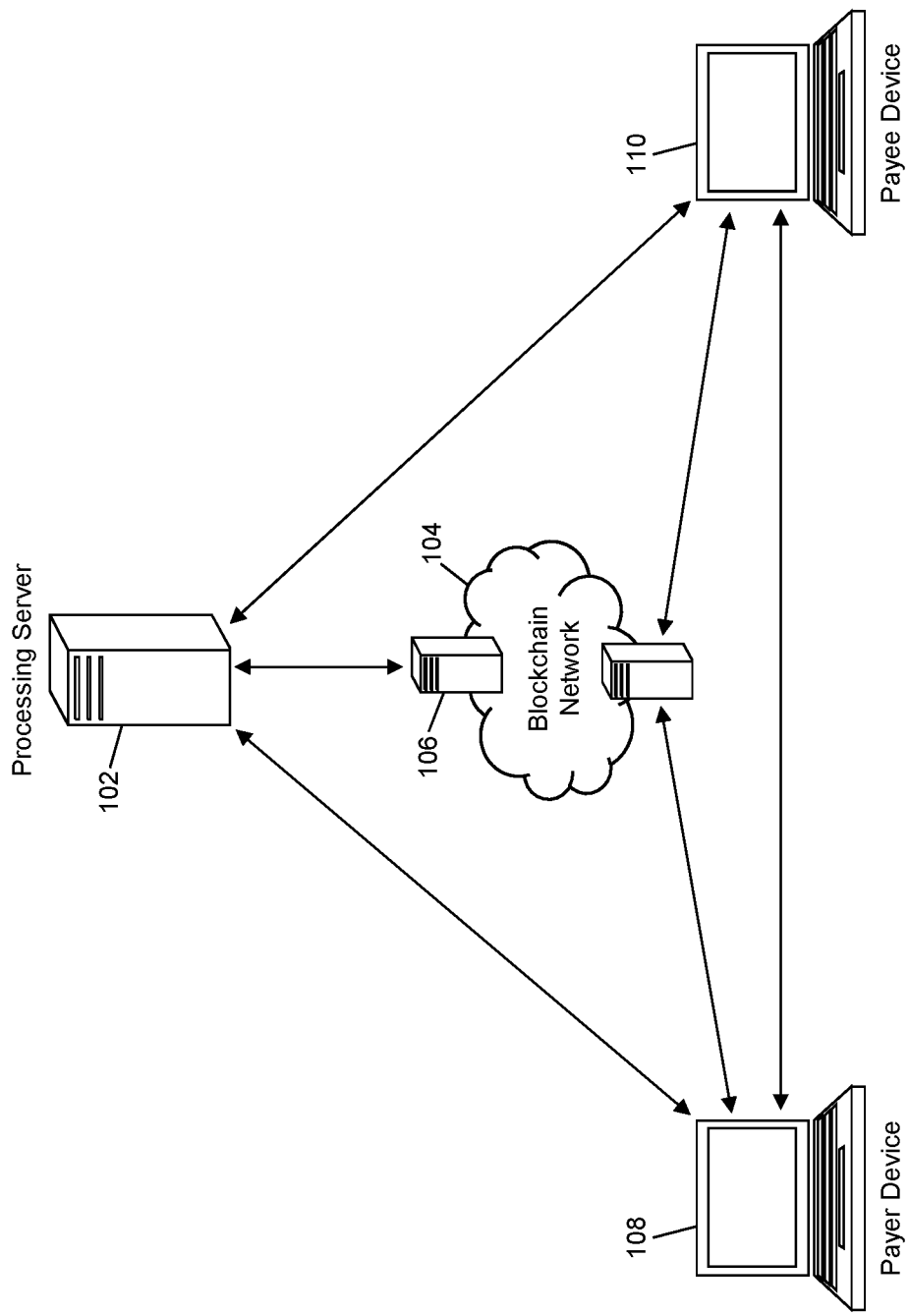
FIG. 1 is a block diagram illustrating a high level system architecture for risk scoring blockchain transactions in accordance with exemplary embodiments.

FIG. 1 illustrates a system 100 for the risk scoring of blockchain transactions, specifically the analysis of historical transactional data for a party to a blockchain transaction for the identification of risk associated with a transaction involving that party, without compromising the anonymity provided by the use of a blockchain.

The system 100 may include a processing server 102. The processing server 102, discussed in more detail below, may be configured to identify risk scores for blockchain transactions based on the transaction frequency and other data associated with one or both electronic wallets (also referred to as "blockchain wallets" or simply "wallets" herein) used in a proposed blockchain transaction. The processing server 102 may be in communication with a blockchain network 104 that is associated with a blockchain on which transactions may be processed and where the processing server 102 may be configured to identify risk scores for future transactions that are proposed for posting to the associated blockchain. The blockchain network 104 may be comprised of a plurality of nodes 106, which may be configured to generate and validate new blocks that are added to the blockchain. In some embodiments, the processing server 102 may be a node 106 in the blockchain network 104. In other embodiments, the processing server 102 may electronically communicate with one or more nodes 106 using suitable communication networks and methods, such as via the Internet, a local area network, a cellular communication network, etc.

The nodes 106 in the blockchain network 104 may be used to generate new blocks that include one or more blockchain transactions that are then validated by other nodes 106 in the blockchain network 104 before being added to the blockchain, which may be made publicly available to any interested party. The blockchain may be thus comprised of a plurality of blocks, where each block includes at least a block header and one or more transaction data values. Each block header may include at least a timestamp, a block reference value, and a transaction reference value. The timestamp may be a time at which the block and/or block header was generated, and may be formatted in any suitable format, such as a UNIX timestamp, using a DateTime object, etc. Each transaction data value may be related to a blockchain transaction and include at least a currency amount that is transferred as part of the transaction, a sending address from which the currency is transferred, and a receiving address to which the currency is transferred, as discussed in more detail below.

The block reference value may be a reference to the previous block added to the blockchain before its respective block, such as may be determined based on the timestamp. In one embodiment, the block reference value may be a hash value generated via a hashing, using one or more suitable algorithms, of the block header of the previous block. The transaction reference value may be a reference to the one or more transaction data values included in the same block. In one embodiment, the transaction reference value may be a hash value generated via a hashing, using one or more suitable algorithms, of the transaction data value(s) included in the block. In some embodiments, the transaction reference value may be the root of a Merkle tree generated using the one or more transaction data values. The use of reference values may ensure the immutability of the blockchain, as any attempted modification to a transaction data value or block header would require modification to that block's transaction reference value and to the block reference value included in every subsequent block header, which must be performed at every single node 106 in the blockchain network 104 before a new block is generated and added to the blockchain. As a result, the blockchain is extremely resistant, if not completely protected, from tampering of transaction data values.

The system 100 may include a payer device 108. The payer device 108 may be any type of computing device suitable for performing the functions discussed here, such as a desktop computer, laptop computer, notebook computer, tablet computer, cellular phone, smart phone, smart watch, smart television, wearable computing device, implantable computing device, etc. The payer device 108 may have a wallet stored therein or otherwise accessible thereby. A blockchain wallet, as discussed herein, may refer to a private key of a cryptographic key pair that is used to generate digital signatures for blockchain transactions, to prove ownership of blockchain currency associated therewith for use in transacting using the blockchain network. For traditional blockchains, the owner of a wallet may be considered to be the entity in possession and/or control of that private key. In the system 100, the payer device 108 may store a private key, referred to herein as the payer private key, which may be used to prove ownership of blockchain currency that is to be paid as part of a proposed blockchain transaction.

The system 100 may include a payee device 110. The payee device 110 may be another suitable computing device, such as the payer device 108, that stores a private key, referred to herein as the payee private key, that may be a wallet to which the blockchain currency that is being paid as part of the proposed blockchain transaction is to be paid. As part of the cryptographic key pair, the payee device 110 may have a corresponding payee public key, which may be used to generate an address (also referred to herein as a "blockchain address") where the blockchain currency may be sent to as part of the transaction. The payee private key may be used in a future transaction to prove the payee device's ownership of that address, to thereby prove ownership of the transferred blockchain currency.

As part of the system 100, the payer device 108 or payee device 110 may submit a proposed blockchain transaction to the processing server 102 for risk scoring. As discussed herein, the entity that is submitting the proposed transaction may be referred to as the "user," whereas the other entity involved in the transaction may be referred to as the "transacting entity." For instance, if the payer is submitting the transaction, the payer may be the user and the payee the transacting entity, or, conversely, if the payee is submitting the transaction, the payee may be the user and the payer may be the transacting entity. The associated cryptographic key pairs, and corresponding private and public keys, may be accordingly referred to as user cryptographic key pairs and transacting cryptographic key pairs.

The user may submit the proposed blockchain transaction to the processing server 102 using any suitable communication network and method, such as via a specifically configured application program, a web page, an application programming interface, etc. The proposed blockchain transaction may include at least the address from which the blockchain currency is being sent (which may be a group of addresses in cases where an amount being sent is greater than the amount possessed by a single address, as will be apparent to persons having skill in the relevant art), the address to receive the blockchain currency, and a transaction amount, which may be the amount of blockchain currency being transferred. The processing server 102 may receive the proposed blockchain transaction and may then identify one or more transaction data values in all of the plurality of blocks in the blockchain where the sending address or the receiving address is associated with the transacting cryptographic key pair that is associated with the transacting address in the proposed blockchain transaction. In other words, the processing server 102 may identify all prior transactions where the transacting entity was either the sender or the recipient.

The processing server 102 may then determine a risk score for the transaction based on at least the identified transaction data values. The processing server 102 may analyze the transaction history of the transacting entity to identify instances of double spend (e.g., where currency was sent from the same address in two separate transactions) or of attempted double spend (e.g., where such was attempted but prevented by the nodes 106), instances where the transacting entity sent currency to or received currency from a fake address (e.g., where no other transactions involving that same wallet can be identified), instances where transactions were conducted rapidly (e.g., a receipt and sending or vice versa immediately back-to-back, which may indicate an attempt to defraud the blockchain network 104 or otherwise double spend), and variances in transaction amount (e.g., if this transaction is for drastically more than usually conducted via the transacting entity). This data may be considered against other transactions conducted by the transacting entity that are considered to be genuine (e.g., that lack indicators of fraud) to determine the risk score, which may be a measure of the trustworthiness of the transacting entity and the particular transaction (e.g., if the proposed transaction is genuine or potentially fraudulent based on the history, proximity to other transactions, similarity or difference to past fraudulent or genuine transactions, etc.). In some cases, the processing server 102 may also take into account the overall frequency of transactions by the transacting entity, or the frequency at the same time of day and/or day of week. The processing server 102 may electronically transmit the determined risk score to the user device, where the user may use the score to determine whether or not to proceed with the proposed blockchain transaction. If the user decides to proceed, they may submit the proposed blockchain transaction to a node 106, which may then validate the transaction and include the transaction in a new block to be validated and added to the blockchain. In cases where the processing server 102 is a node 106, the user device may instruct the processing server 102 to proceed with the proposed blockchain transaction, where the processing server 102 may validate the transaction and include it in a newly generated block.

In some cases, the processing server 102 may receive feedback from the user and/or the blockchain network 104 that indicates if the proposed blockchain transaction was conducted and was later found to be fraudulent or genuine. In such cases, the processing server 102 may use such data to improve its determination engine for use in determining future fraud scores. As such, the processing server 102 may continually adjust algorithms used to determine risk scores based on the success or failure of past risk scores to attempt to optimize determinations and their accuracy.

In some embodiments, the processing server 102 may be able to identify the computing device used by the transacting entity in the proposed blockchain transaction. For instance, the proposed blockchain transaction may include a device identifier associated with the computing device, such as an Internet Protocol address, media access control address, etc. In such embodiments, the processing server 102 may identify past blockchain transactions that were conducted using the same computing device, if such data is available in the blockchain. In these embodiments, the risk score may be affected by the number of transactions conducted using the computing device, particularly the frequency of transactions that may be conducted using other wallets. For example, a high frequency of transactions conducted by a single device using a significant number of wallets may indicate a stronger likelihood of fraud, which may affect the risk score accordingly. In some cases, the frequency may be compared to the frequency of other computing devices that use multiple wallets for genuine transactions (e.g., at a public terminal accessed by multiple individuals).

In some embodiments, the processing server 102 may also consider geographic and other outside factors in determining the risk score. For instance, if a geographic location of the transacting entity is available, such as through an Internet Protocol address associated with the transacting entity's wallet or other similar data, the processing server 102 may include the likelihood of fraud based on the geographic location in the determination of the risk score, such as by increasing the risk if the transacting entity is located in a geographic area where fraud is more often perpetuated. In some instances, the processing server 102 may consider fraud for non-blockchain transactions. For example, if the transacting entity is in a geographic area that is rife with fraud for credit card transactions, the risk for fraud in the proposed blockchain transaction may be increased. Additional factors that may be considered by the processing server 102 may include time of day, day of week, day of month, market conditions, or a combination thereof (e.g., a specific time of day in a specific geographic area when fraud is often conducted).

In some embodiments, the processing server 102 may also consider the node 106 used to submit the blockchain transaction in determining the risk score. For instance, in such embodiments, the proposed blockchain transaction may include information identifying the node 106 to which the blockchain transaction is to be submitted, or may be received by the processing server 102 via such a node 106. In these cases, the processing server 102 may then identify prior blockchain transactions that were submitted through the node 106 if such data is available in the blockchain. The processing server 102 may identify the frequency of fraudulent transactions (e.g., double spend transactions, transactions conducted with a fake address, etc.) conducted or attempted via that node, the frequency of fraudulent transactions compared to the frequency for other nodes 106, the geographic location of the node and likelihood of fraud based on the area, and other factors as discussed herein. The processing server 102 may include this data in determining the risk score for the proposed transaction. In some cases, the processing server 102 may provide the user with a risk score for the transacting entity and a separate risk score for the node 106, which may enable the user to decide to proceed with the proposed blockchain transaction at a different node 106 if the risk score for the transacting entity is suitable.

The methods and systems discussed herein provide for the determination of risk scores for a blockchain transaction where both entities are anonymous. The processing server 102 is specifically configured to identify the wallets being used in a proposed transaction and then identify past blockchain transactions involving those wallets to identify a likelihood of risk based on a plurality of different factors that can be identified from the historical data, without compromising the anonymity granted by using blockchain. The result is that the processing server 102 may provide an estimate of the likelihood that the transaction or the transacting entity may be fraudulent to the user, which may inform the user as to whether or not to proceed with a transaction, which may be valuable for standard blockchains where there is no method of recourse if fraud is perpetuated by the other party.

Processing Server

Figure 2:
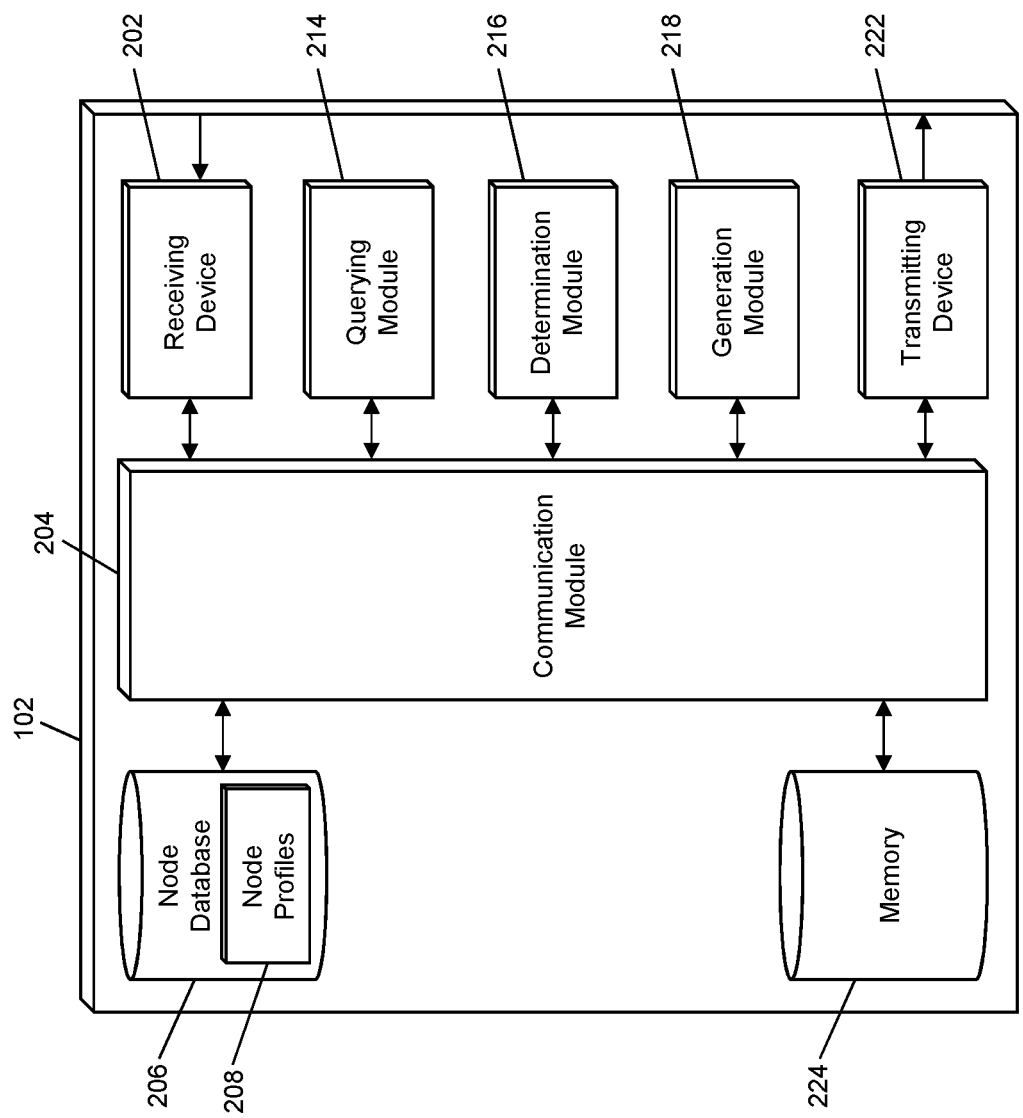
FIG. 2 is a block diagram illustrating the processing server of the system of FIG. 1 for risk scoring blockchain transactions in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 500 illustrated in FIG. 5 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from nodes 106 in blockchain networks 104, payer devices 108, payee devices 110, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by nodes 106 in a blockchain network 104 that may be superimposed or otherwise encoded with blockchain data. The blockchain data may include validated blocks that have been added to the blockchain or other data for the processing server 102 to maintain or received an updated blockchain. In cases where the processing server 102 may be a node 106, the receiving device 202 may receive blocks to be validated or validations of a submitted block as part of standard processes for adding new blocks to a blockchain. The receiving device 202 may also be configured to receive data signals electronically transmitted by payer devices 108 and payee devices 110 that may be superimposed or otherwise encoded with proposed blockchain transactions, which may include at least a user address, a transacting address, and a transaction amount, and may also include a transacting device identifier, a node identifier, a geographic location, or other additional information that may be used in the determination of a risk score as discussed herein.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 214, determination module 216, generation module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

In some embodiments, the processing server 102 may include a node database 206. The node database 206 may be configured to store a plurality of node profiles 208 using a suitable data storage format and schema. The node database 206 may be a relational database that utilizes structured query language for the storage, identification, modifying, updating, accessing, etc. of structured data sets stored therein. Each node profile 208 may be a structured data set configured to store data related to a node 106. The node profile 208 may include, for instance, information identifying the node 106, also referred to herein as a node identifier, such as a media access control address, internet protocol address, registration number, serial number, etc. The node profile 208 may also include any additional data associated with the related node 106 that may be used in the determination of a risk score, such as the geographic area of the node 106, transaction data values for past transactions submitted through the node 106 that were added or were attempted to be added to the blockchain, etc.

The processing server 102 may include a querying module 214. The querying module 214 may be configured to execute queries on databases to identify information. The querying module 214 may receive one or more data values or query strings, and may execute a query string based thereon on an indicated database, such as the node database 206, to identify information stored therein. The querying module 214 may then output the identified information to an appropriate engine or module of the processing server 102 as necessary. The querying module 214 may, for example, execute a query on the node database 206 to identify a node profile 208 related to a proposed blockchain transaction based on an include node identifier. The querying module 214 may also execute queries on blockchain data to identify transaction data values that include a transacting address for a proposed blockchain transaction as the sending address or receiving address, that were submitted through a specific node, that include a device identifier supplied in the proposed blockchain transaction, etc.

The processing server 102 may also include a determination module 216. The determination module 216 may be configured to determine risk scores for the processing server 102 using the methods discussed herein. The determination module 216 may receive data that may be used to determine a risk score, may determine a risk score based on that data, and may output the risk score to another module or engine of the processing server 102. The determination module 216 may be configured to identify risk scores based on the criteria discussed herein, such as the frequency of fraudulent transactions or attempted fraudulent transactions by a transacting entity, the timing of transactions conducted by a transacting entity, the frequency of transactions with fake addresses by the transacting entity, etc. The determination module 216 may also determine risk scores for nodes 106 and may also utilize external criteria for determining risk scores, such as fraud rates in geographic areas, etc.

The processing server 102 may also include a generation module 218. The generation module 218 may be configured to generate data for use by the processing server 102 in performing the functions discussed herein. The generation module 218 may receive instructions as input, may generate data as instructed, and may output the generated data to another module or engine of the processing server 102. For example, the generation module 218 may be configured to generate messages for electronic transmission to user devices, such as may include determined risk scores. In embodiments where the processing server 102 may be a node 106 in the blockchain network 104, the generation module 218 may be configured to generate block reference values and transaction reference values via hashing the appropriate data as discussed herein, block headers, and blocks for validation by other nodes 106 prior to addition to the blockchain.

The processing server 102 may also include a transmitting device 222. The transmitting device 222 may be configured to transmit data over one or more networks via one or more network protocols. In some instances, the transmitting device 222 may be configured to transmit data to nodes 106, payer devices 108, payee devices 110, and other entities via one or more communication methods, local area networks, wireless area networks, cellular communication, Bluetooth, radio frequency, the Internet, etc. In some embodiments, the transmitting device 222 may be comprised of multiple devices, such as different transmitting devices for transmitting data over different networks, such as a first transmitting device for transmitting data over a local area network and a second transmitting device for transmitting data via the Internet. The transmitting device 222 may electronically transmit data signals that have data superimposed that may be parsed by a receiving computing device. In some instances, the transmitting device 222 may include one or more modules for superimposing, encoding, or otherwise formatting data into data signals suitable for transmission.

The transmitting device 222 may be configured to electronically transmit data signals superimposed or otherwise encoded with determined risk scores to payer devices 108 and payee devices 110 using suitable communication networks and methods, such as through application programming interfaces, specifically configured application programs, web pages, etc., using cellular communication networks, local area networks, the Internet, etc. The transmitting device 222 may also be configured to electronically transmit data signals to nodes 106 that may be superimposed or otherwise encoded with requests for blockchain data and other data for use by the processing server 102 in performing the functions discussed herein, such as for node identifiers, geographic locations, etc. In embodiments where the processing server 102 may be a node 106, the transmitting device 222 may electronically transmit data signals superimposed or otherwise encoded with blocks to be validated and validations of blocks to other nodes 106 in the blockchain network 104.

The processing server 102 may also include a memory 224. The memory 224 may be configured to store data for use by the processing server 102 in performing the functions discussed herein, such as public and private keys, symmetric keys, etc. The memory 224 may be configured to store data using suitable data formatting methods and schema and may be any suitable type of memory, such as read-only memory, random access memory, etc. The memory 224 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 224 may be comprised of or may otherwise include a relational database that utilizes structured query language for the storage, identification, modifying, updating, accessing, etc. of structured data sets stored therein. The memory 224 may be configured to store, for example, the blockchain associated with the blockchain network 104 or other data associated therewith, fraud rates for geographic locations and other factors, feedback data regarding determined fraud scores, etc.

Process for Risk Scoring Blockchain Transactions

Figure 3:
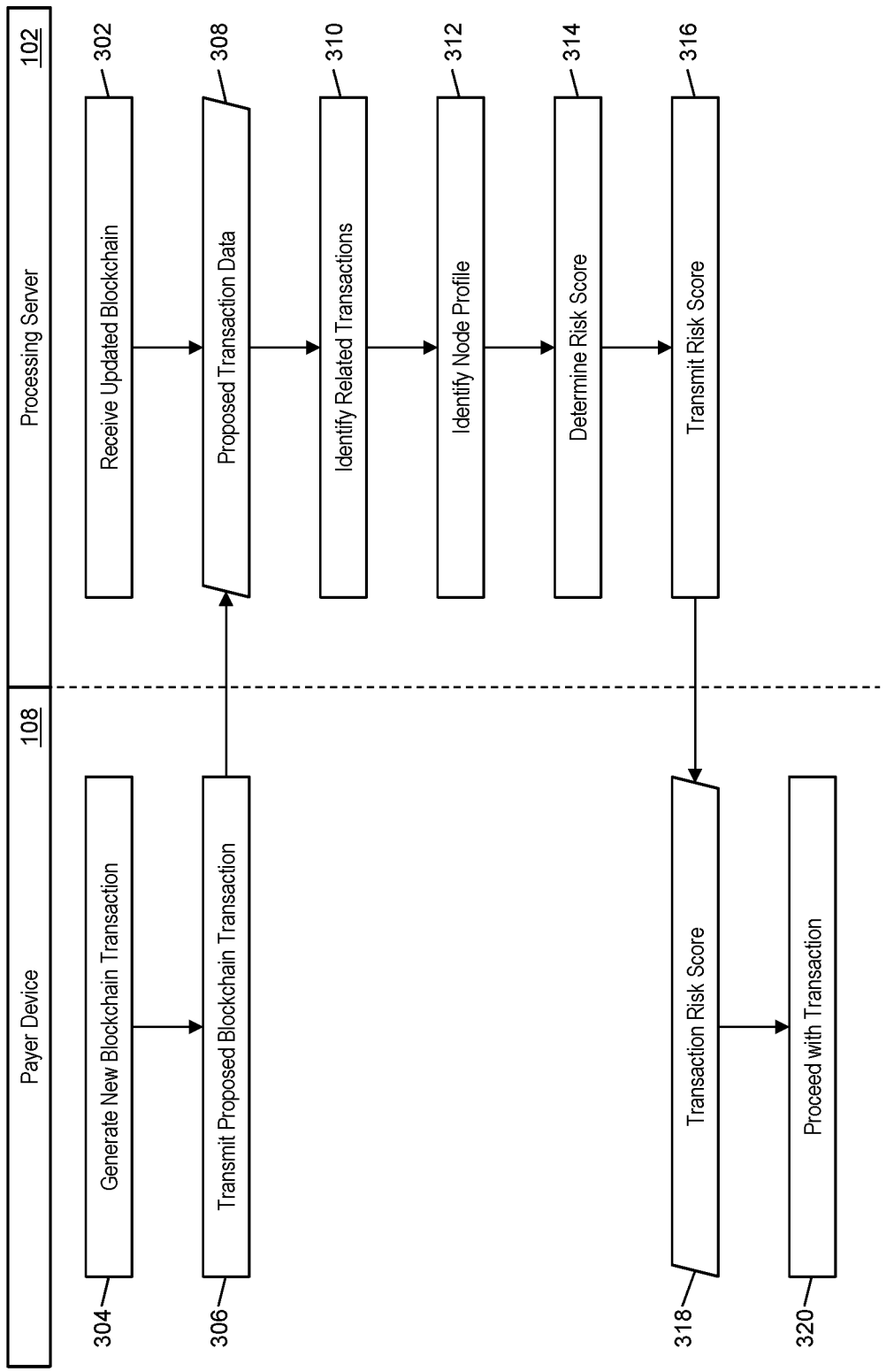
FIG. 3 is a flow diagram illustrating a process for risk scoring blockchain transactions in the system of FIG. 1 in accordance with exemplary embodiments.

FIG. 3 illustrates a process for the risk scoring of a proposed blockchain transaction in the system 100 of FIG. 1.

In step 302, the receiving device 202 of the processing server 102 may receive updated blockchain data from one or more nodes 106 in the blockchain network 104, where the updated blockchain data includes the latest blocks added to the blockchain such that the processing server 102 possess or has access to the blocks comprising the blockchain and the data included therein. In step 304, the payer device 108 may generate a new, proposed blockchain transaction, which may include at least a transaction amount, one or more sending addresses from which the payer is sending the transaction amount, and a receiving address associated with the payee device 110 to which the transaction amount is being sent. In step 306, the payer device 108 may electronically transmit the proposed blockchain transaction to the processing server 102 using a suitable communication network and method. It will be apparent to persons having skill in the relevant art that, in the example illustrated in FIG. 3 and discussed herein, the payer is the user and the payee the transacting entity, but that the system is not limited to the user being the payer and may submit a proposed blockchain transaction as a payee. In some embodiments, the payer device 108 may include a device identifier associated with the payee device 110, a node identifier associated with the intended node 106, or other data that may be used by the processing server 102 in determining a risk score, if available.

In step 308, the receiving device 202 of the processing server 102 may receive the submitted proposed blockchain transaction. In step 310, the querying module 214 of the processing server 102 may execute a query on the memory 224 of the processing server 102 to identify all past transaction data values related to blockchain transactions involving the payee device 110 where the sending or receiving device is associated with the same cryptographic key pair as the receiving address in the proposed blockchain transaction (e.g., was generated by the same public key). In step 312, the querying module 214 of the processing server 102 may execute a query on the node database 206 of the processing server 102 to identify a node profile 208 associated with the intended node 106 for the proposed blockchain transaction, if a node identifier was made available by the payer device 108.

In step 314, the determination module 216 of the processing server 102 may determine a risk score for the proposed blockchain transaction based on at least the transaction data values identified that are associated with the payee, including the number of double spend transactions, number of attempts at double spending, variance in transaction amounts, speed of spending currency after receipt, number of transactions involving fake addresses, overall frequency of transactions, frequency of transactions at a given time and/or date, number of transactions conducted using multiple internet protocol addresses and/or geographic locations, etc. In instances where a device identifier is available, the risk score may also be based on the number of other wallets utilized by the same payee device 110 and the frequency of such transactions and frequency of fraudulent transactions by the payee device 110. In cases where the node identifier may be available, the risk score may be further based on the frequency of fraudulent transactions submitted through the node 106, the geographic location of the node 106, etc. In some such cases, the determination module 216 may determine separate risk scores for the payee device 110, the transaction, and/or the node 106.

In step 316, the transmitting device 222 of the processing server 102 may electronically transmit the determined risk score(s) to the payer device 108 using a suitable communication network and method. In step 318, the payer device 108 may receive the risk score(s), and may display them to the user. The user may then decide whether or not to proceed with the proposed blockchain transaction (and whether to use a different node 106, if applicable). If the user is satisfied with the estimated risk, then, in step 320, may decide to move forward with submitting the proposed blockchain transaction to a node 106. In cases where the processing server 102 may be a node 106, the payer device 108 may submit an instruction to the processing server 102 (e.g., to be received by the receiving device 202) to begin processing the proposed blockchain transaction. In such cases, the payer device 108 may be required to submit a digital signature to prove ownership of the sending address(es) prior to processing of the blockchain transaction, if not already included in the proposed blockchain transaction data submitted in step 306.

Exemplary Method for Risk Scoring a Blockchain Transaction

Figure 4:
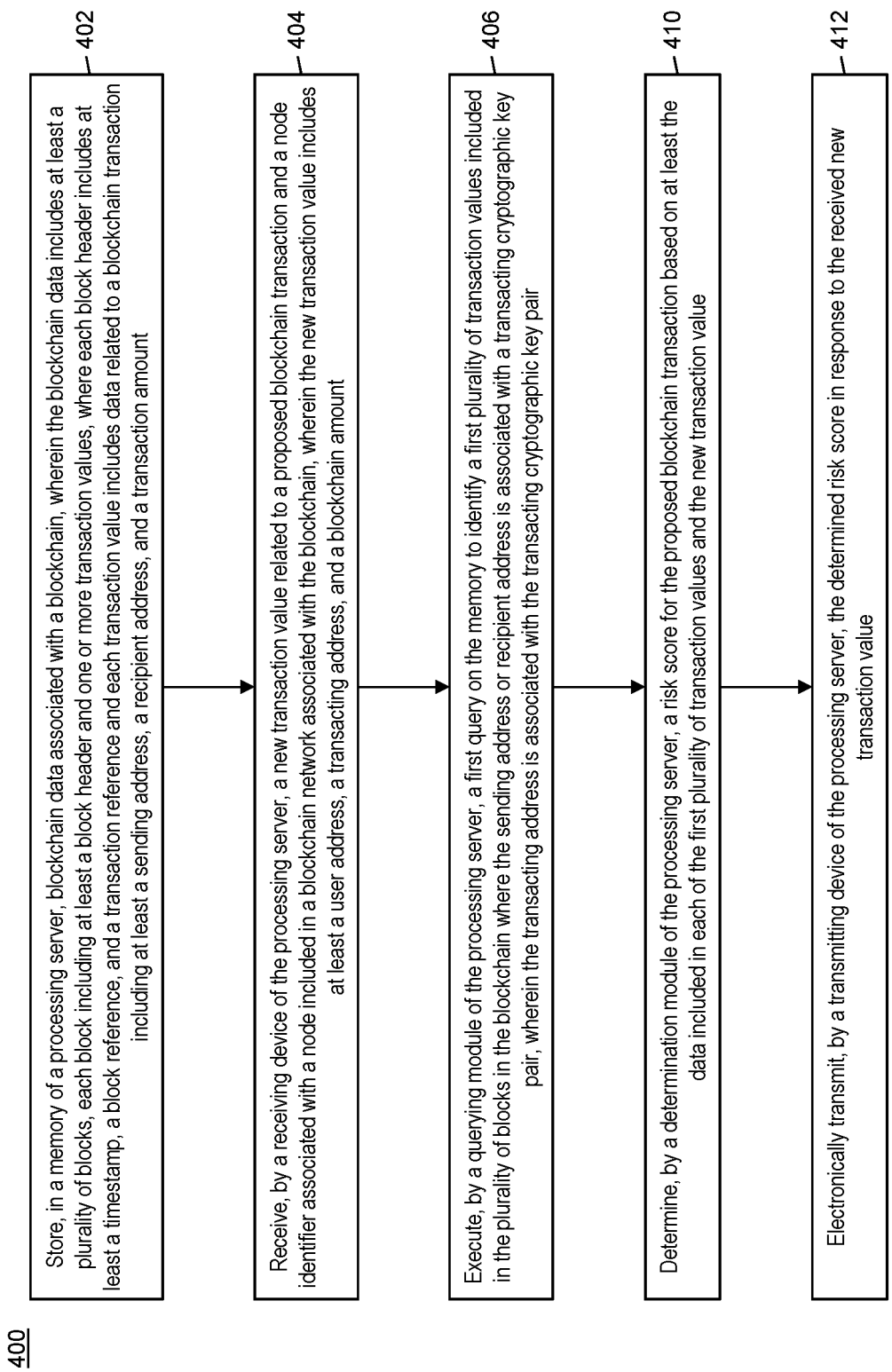
FIG. 4 is a flow chart illustrating an exemplary method for risk scoring a blockchain transaction in accordance with exemplary embodiments.

FIG. 4 illustrates a method 400 for the risk scoring of a blockchain transaction based on historical transaction data and fraud markers for a blockchain wallet involved in the proposed blockchain transaction.

In step 402, blockchain data associated with a blockchain may be stored in a memory (e.g., the memory 224) of a processing server (e.g., the processing server 102), wherein the blockchain data includes at least a plurality of blocks, each block including at least a block header and one or more transaction values, where each block header includes at least a timestamp, a block reference, and a transaction reference and each transaction value includes data related to a blockchain transaction including at least a sending address, a recipient address, and a transaction amount. In step 404, a new transaction value related to a proposed blockchain transaction and a node identifier associated with a node (e.g., a node 106) included in a blockchain network (e.g., the blockchain network 104) associated with the blockchain may be received by a receiving device (e.g., the receiving device 202) of the processing server, wherein the new transaction value includes at least a sending address, a recipient address, and a transaction amount.

In step 406, a query may be executed on the memory of the processing server by a querying module (e.g., the querying module 214) of the processing server to identify a first plurality of transaction values included in the plurality of blocks in the blockchain where the sending address or recipient address is associated with a transacting cryptographic key pair, wherein the transacting address is associated with the transacting cryptographic key pair. In step 408, a risk score may be determined for the proposed blockchain transaction by a determination module (e.g., the determination module 216) of the processing server based on at least the data included in each of the first plurality of transaction values and the new transaction value. In step 410, the determined risk score may be electronically transmitted by a transmitting device (e.g., the transmitting device 222) of the processing server in response to the received new transaction value.

In one embodiment, the risk score may be further based on the node identifier. In some embodiments, the new transaction value may include at least one device identifier, each transaction value may include a sending device identifier and a receiving device identifier, and the risk score may be further based on a frequency of the at least one device identifier as the sending device identifier and/or the receiving device identifier in the one or more transaction values included in the plurality of blocks. In a further embodiment, the device identifier may be an internet protocol address.

In one embodiment, the risk score may be further based on a frequency of transactions conducted by the transacting cryptographic key pair. In a further embodiment, the frequency of transactions may be a frequency of declined or failed transactions. In some embodiments, the method 400 may further include storing, in a node database (e.g., the node database 206) of the processing server, a node profile (e.g., node profile 208), wherein the node profile includes a structured data set related to the node including at least the node identifier and a geographic location, wherein the risk score is further based on the geographic location stored in the node profile. In a further embodiment, the node profile may further include a fraud frequency value, and the risk score may be further based on the fraud frequency value.

Computer System Architecture

Figure 5:
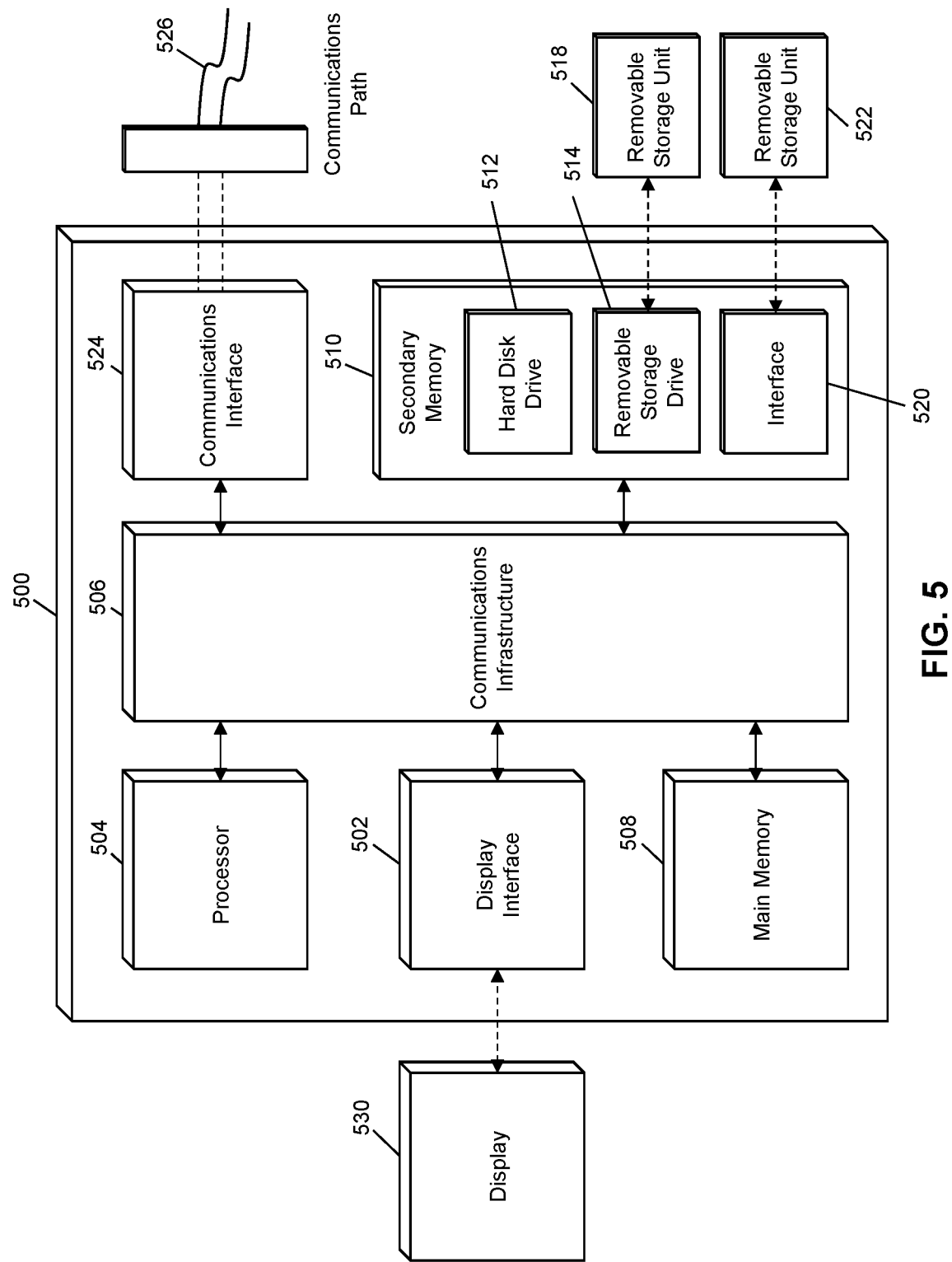
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the processing server 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for risk scoring blockchain transactions. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for risk scoring a blockchain transaction, comprising:

storing, in a memory of a processing server, blockchain data associated with a public_blockchain, wherein the blockchain data includes at least a plurality of blocks, each block including at least a block header and one or more transaction values, where each block header includes at least a timestamp, a block reference, and a transaction reference and each transaction value includes data related to a blockchain transaction including at least a sending address, a recipient address, and a transaction amount;

receiving, by a receiving device of the processing server, a new transaction value related to a proposed blockchain transaction and a node identifier associated with a node included in a public blockchain network associated with the public blockchain, wherein the new transaction value includes at least a user address, a transacting address, and a blockchain amount;

executing, by a querying module of the processing server, a first query on the memory to identify a first plurality of transaction values included in the plurality of blocks in the public blockchain where the sending address or recipient address is associated with a transacting cryptographic key pair, wherein the transacting address is associated with the transacting cryptographic key pair;

determining, by a determination module of the processing server, a risk score for the proposed blockchain transaction based on at least the data included in each of the first plurality of transaction values, the new transaction value, and a frequency of transactions conducted by the transacting cryptographic key pair; and electronically transmitting, by a transmitting device of the processing server, the determined risk score in response to the received new transaction value.

2. The method of claim 1, wherein the risk score is further based on the node identifier.

3. The method of claim 1, wherein the frequency of transactions is a frequency of declined or failed transactions.

4. The method of claim 1, further comprising:
storing, in a node database of the processing server, a node profile, wherein the node profile includes a structured data set related to the node including at least the node identifier and a geographic location, wherein
the risk score is further based on the geographic location stored in the node profile.

5. The method of claim 4, wherein
the node profile further includes a fraud frequency value, and
the risk score is further based on the fraud frequency value.

6. The method of claim 1, wherein
the new transaction value includes at least one device identifier,
each transaction value includes a sending device identifier and a receiving device identifier, and
the risk score is further based on a frequency of the at least one device identifier as the sending device identifier and/or the receiving device identifier in the one or more transaction values included in the plurality of blocks.

7. The method of claim 6, wherein the device identifier is an internet protocol address.

8. The method of claim 1 further comprising:
generating, by the generation module of the processing server, a new blockchain block including the proposed blockchain transaction;
transmitting, by the transmitting device of the processing server, the new blockchain block to one or more nodes on the public blockchain;
receiving, by the receiving device of the processing server, a validation of the new block including the proposed blockchain transaction by the one or more nodes on the public blockchain;
receiving, by the receiving device of the processing receiving, by the receiving device of the processing server, user feedback for the validated proposed blockchain transaction, the user feedback indicating the validated proposed blockchain transaction was fraudulent or genuine; and
updating, by the processing server, one or more fraud algorithms of the determination module of the processing server based on the user feedback.

9. A system for risk scoring a blockchain transaction, comprising:
a memory of a processing server configured to store blockchain data associated with a public blockchain, wherein the blockchain data includes at least a plurality of blocks, each block including at least a block header and one or more transaction values, where each block header includes at least a timestamp, a block reference, and a transaction reference and each transaction value includes data related to a blockchain transaction including at least a sending address, a recipient address, and a transaction amount;
a receiving device of the processing server configured to receive a new transaction value related to a proposed blockchain transaction and a node identifier associated with a node included in a public blockchain network associated with the public blockchain, wherein the new transaction value includes at least a user address, a transacting address, and a blockchain amount;
a querying module of the processing server configured to execute a first query on the memory to identify a first plurality of transaction values included in the plurality of blocks in the public blockchain where the sending address or recipient address is associated with a transacting cryptographic key pair, wherein the transacting address is associated with the transacting cryptographic key pair;
a determination module of the processing server configured to determine a risk score for the proposed blockchain transaction based on at least the data included in each of the first plurality of transaction values, the new transaction value, and a frequency of transactions conducted by the transacting cryptographic key pair; and
a transmitting device of the processing server configured to electronically transmit the determined risk score in response to the received new transaction value.

10. The system of claim 9, wherein the risk score is further based on the node identifier.

11. The system of claim 9, wherein the frequency of transactions is a frequency of declined or failed transactions.

12. The system of claim 9, further comprising:
a node database of the processing server configured to store a node profile, wherein the node profile includes a structured data set related to the node including at least the node identifier and a geographic location, wherein
the risk score is further based on the geographic location stored in the node profile.

13. The system of claim 12, wherein
the node profile further includes a fraud frequency value, and
the risk score is further based on the fraud frequency value.

14. The system of claim 9, wherein
the new transaction value includes at least one device identifier,
each transaction value includes a sending device identifier and a receiving device identifier, and
the risk score is further based on a frequency of the at least one device identifier as the sending device identifier and/or the receiving device identifier in the one or more transaction values included in the plurality of blocks.

15. The system of claim 14, wherein the device identifier is an internet protocol address.

16. The system of claim 9, further comprising:
the generation module of the processing server configured to generate a new blockchain block including the proposed blockchain transaction;
the transmitting device of the processing server configured to transmit the new blockchain block to one or more nodes on the public blockchain;
the receiving device of the processing server configured to receive a validation of the new block including the proposed blockchain transaction by the one or more nodes on the public blockchain;
the receiving device of the processing server configured to the receiving device of the processing server configured to receive user feedback for the validated proposed blockchain transaction, the user feedback indicating the validated proposed blockchain transaction was fraudulent or genuine; and
the processing server configured to update one or more fraud algorithms of the determination module of the processing server based on the user feedback.

* * * * *